United States Patent
Sohn

(12) 
(10) Patent No.: US 6,593,898 B2
(45) Date of Patent: Jul. 15, 2003

(54) ANTENNA APPARATUS IN MOBILE COMMUNICATION SYSTEM

(75) Inventor: Young-Kyu Sohn, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/933,637

(22) Filed: Aug. 20, 2001

(65) Prior Publication Data

US 2002/0089465 A1 Jul. 11, 2002

(30) Foreign Application Priority Data

Aug. 18, 2000 (KR) .................................. 2000-0047970

(51) Int. Cl.[7] .............................................. H01Q 21/00
(52) U.S. Cl. ..................................... 343/844; 343/893
(58) Field of Search ................................. 343/844, 853, 343/890, 893, 908

(56) References Cited

U.S. PATENT DOCUMENTS

| | | | | |
|---|---|---|---|---|
| 5,543,811 A | * | 8/1996 | Chethik | 343/844 |
| 5,546,420 A | * | 8/1996 | Seshadri et al. | 370/342 |
| 5,872,548 A | * | 2/1999 | Lopez | 343/890 |
| 6,088,003 A | * | 7/2000 | Bassirat | 343/890 |
| 6,127,988 A | * | 10/2000 | McNichol | 343/844 |
| 6,259,419 B1 | * | 7/2001 | Monte | 343/890 |
| 6,323,823 B1 | * | 11/2001 | Wong et al. | 343/844 |

FOREIGN PATENT DOCUMENTS

| | | |
|---|---|---|
| JP | 08-307923 | 11/1996 |
| JP | 11-017605 | 1/1999 |
| JP | 2001-024569 | 1/2001 |
| WO | WO 00/25482 | 5/2000 |
| WO | WO 01/03331 | 1/2001 |

* cited by examiner

Primary Examiner—Don Wong
Assistant Examiner—Shih-Chao Chen
(74) Attorney, Agent, or Firm—Dilworth & Barrese, LLP

(57) ABSTRACT

There is provided an antenna apparatus in a CDMA mobile communication system. A pair of pre-processors are assigned to each of n sectors for transmission and reception diversity. Each pre-processor has a transmission port and a reception port to separate a transmission signal from a reception signal. A pair of triangular antennas are assigned to each sector. In each triangular antenna, a transmission antenna unit transmits a transmission signal received via a transmission port in its sector in the direction of the sector, and a reception antenna unit, connected to the transmission antenna unit at a predetermined horizontal angle θ, receives a signal directed to an adjacent sector and transmits the received signal to the reception port of a pre-processor in the adjacent sector.

5 Claims, 3 Drawing Sheets

ANTENNA APPARATUS IN MOBILE COMMUNICATION SYSTEM

PRIORITY

This application claims priority to an application entitled "Antenna Apparatus in Mobile Communication System" filed in the Korean Industrial Property Office on Aug. 18, 2000 and assigned Serail No. 2000-47970, the contents of which are hereby incorporated by reference.

BACKGROUND OF THE INVENTION

1. Field of the Invention

The present invention relates generally to an antenna apparatus in a CDMA mobile communication system, and in particular, to an antenna apparatus with a reduced number of antennas in a W-CDMA mobile communication system.

2. Description of the Related Art

Antennas are arranged generally in three sectors in a second generation (2G) (CDMA and PCS) mobile communication system.

FIG. 1 illustrates an antenna layout in the 2G mobile communication system.

Referring to FIG. 1, antennas are arranged in three sectors, each sector containing 120° and adjacent to two of the sectors. For reception diversity (Rx diversity), two antennas are provided in each sector. One of the two antennas is used for the dual purpose of transmission and reception (TX/RX antenna) and the other is used exclusively for reception (RX antenna). Each transmission antenna transmits a signal in the direction of a corresponding sector and each reception antenna receives a signal directed to the sector. A received signal is input to a reception port of a pre-processor (not shown) connected to the antenna. A transmission signal generated in the communication system is transmitted through a transmission port of the pre-processor and the transmission/reception antenna (TX/RX antenna) in the corresponding sector. The pre-processor usually operates in a duplexing method. In this structure, an antenna is fabricated with an array of dipole resonators to cover both transmission and reception frequencies. Beyond a predetermined bandwidth, however, the functional efficiency of the resonators is markedly decreased.

For example, in a system having a 250 MHz transmission/reception frequency band between 1920 and 2170 MHz such as an IMT2000 system, the antenna currently in use is composed of such resonators resulting in limitations in the reliability of the overall system. In one attempt to solve this problem, the transmission/reception antenna is separated into a transmission antenna and a reception antenna, resulting in the number of antennas per sector increasing to four (two transmission antenna and two reception antenna) in an IMT2000 system supporting transmission/reception diversity as compared to the 2G system.

Use of four antennas per sector for transmission/reception of signals occupy too much space and requires increased antenna height.

SUMMARY OF THE INVENTION

It is, therefore, an object of the present invention to provide an antenna apparatus that overcomes the conventional antenna problems.

It is another object of the present invention to provide an antenna apparatus having a reduced number of triangular shaped antennas, each triangular antenna incorporating a transmission antenna unit for transmitting a transmission signal in the direction of a corresponding sector and a reception antenna unit for receiving a signal directed to an adjacent sector in a mobile communication system.

The foregoing and other objects of the present invention are achieved by providing an antenna apparatus in a CDMA mobile communication system. In the antenna apparatus, a pair of pre-processors are assigned to each of n sectors for transmission and reception diversity. Each pre-processor has a transmission port and a reception port to separate a transmission signal from a reception signal. A pair of triangular antennas are assigned to each sector. In each triangular antenna, a transmission antenna unit transmits a transmission signal received via a transmission port in its sector in the direction of the sector, and a reception antenna unit, connected to the transmission antenna unit at a predetermined horizontal angle θ, receives a signal directed to an adjacent sector and sends the received signal to the reception port of a pre-processor in the adjacent sector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The present invention is intended to reduce the number of antennas required in a CDMA mobile communication system. The present invention improves the structures of separate transmission (Tx) and reception (Rx) antennas. Connections are made between each antenna and preprocessors in a base station. The connections and antennas are designed in such a manner to increase the reliability and increase the transmission/reception frequency band in a wireless communication system employing duplexing in signal transmission and reception.

Figure 1:
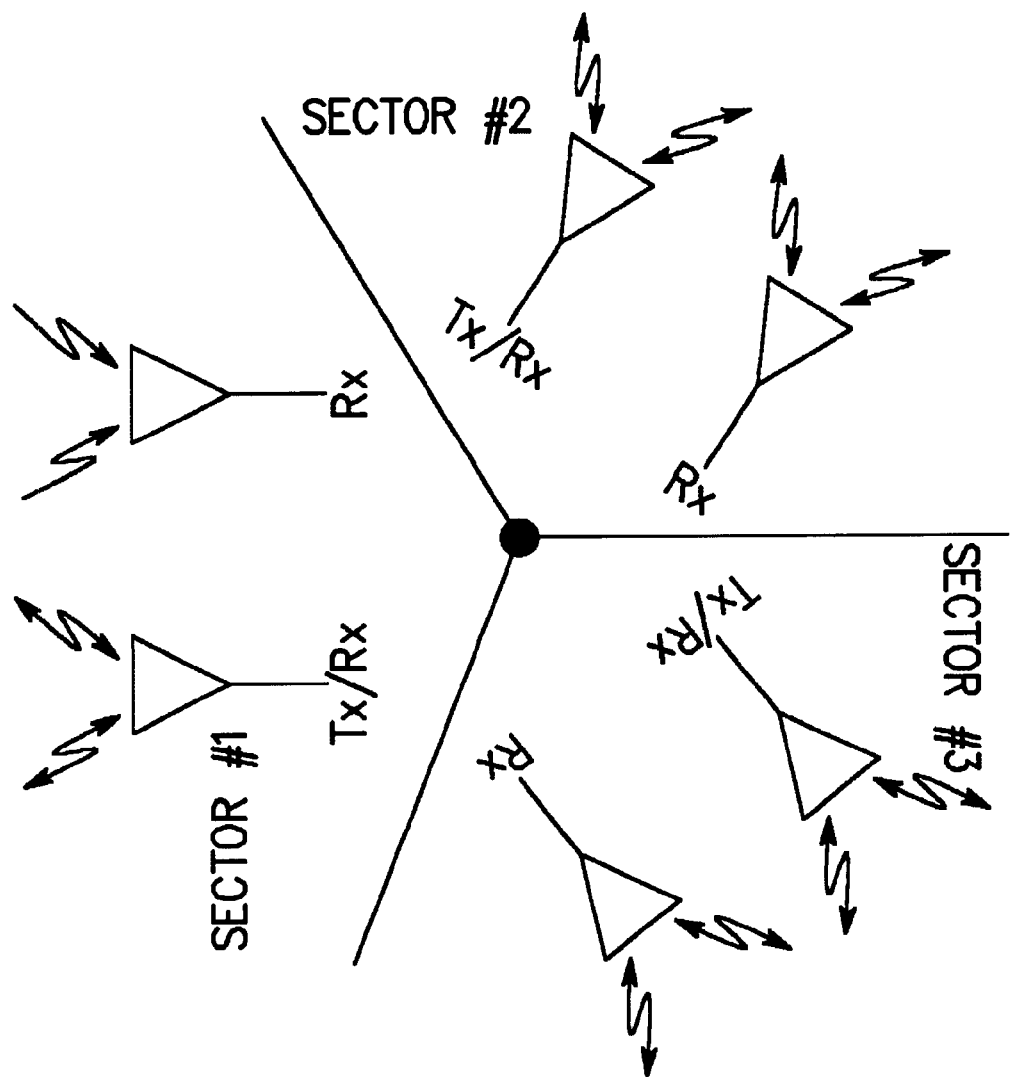
FIG. 1 illustrates a typical antenna layout in a mobile communication system.
Figure 2A:
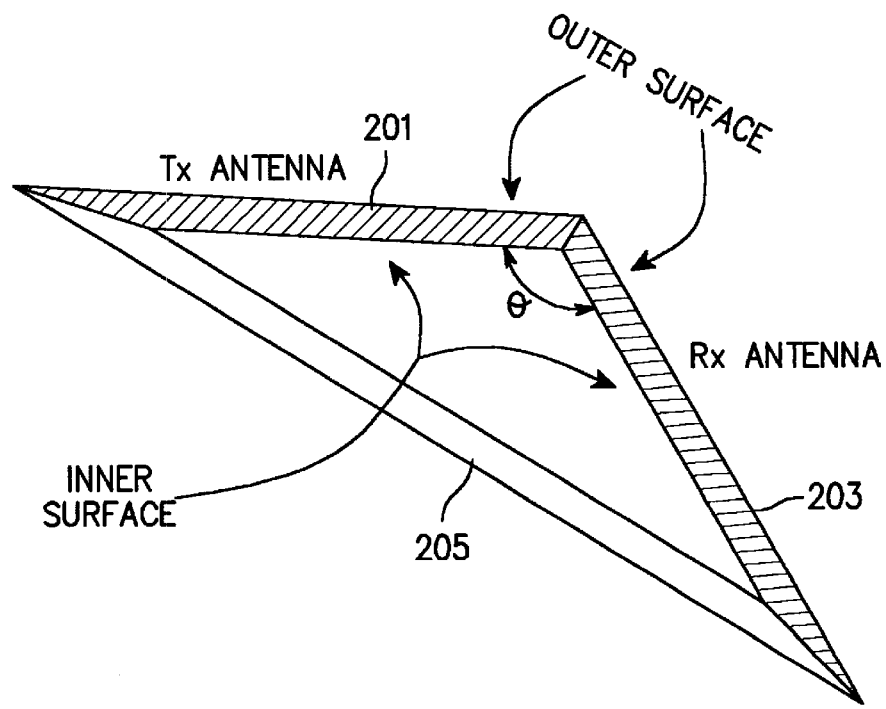
FIGS. 2A and 2B illustrate the structure of an antenna according to an embodiment of the present invention.
Figure 2B:
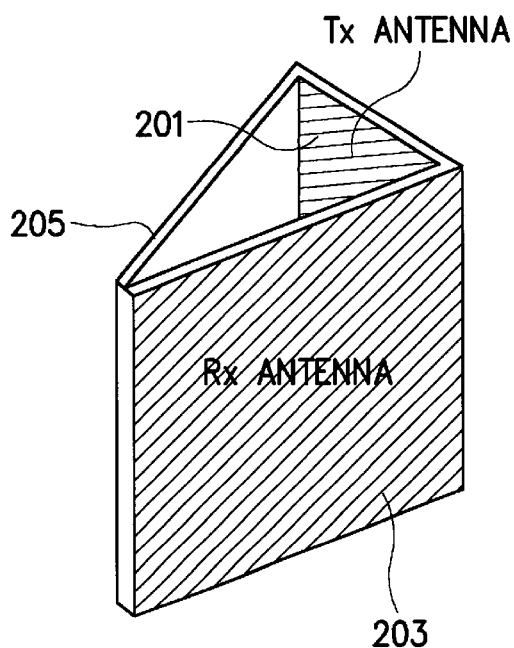

FIG. 2A is a plan view of an antenna according to an embodiment of the present invention and FIG. 2B is a side view of the antenna.

Referring to FIGS. 2A and 2B, an antenna according to the embodiment of the present invention is comprised of a transmission antenna unit 201, a reception antenna unit 203, and a fixing pole 205. When assembled, each antenna has an inner surface and an outer surface. In the preferred embodiment, the transmission antenna unit 201 and the reception antenna unit 203 are shown in FIG. 2B having outer surfaces shaped into squares. It is to be noted here that the transmission antenna unit 201 and the reception antenna unit 203 may be formed into other shapes without departing from the scope of the present invention. The fixing pole 205 serves to fix the transmission antenna unit 201 and the reception antenna unit 203 in such a manner to form a horizontal angle θ between the inner surfaces of the transmission and reception antenna units. Hereinbelow, the assembled antenna with the transmission antenna unit 201, the reception antenna unit 203, and the fixing pole 205 is referred to as a triangular antenna.

Figure 3:
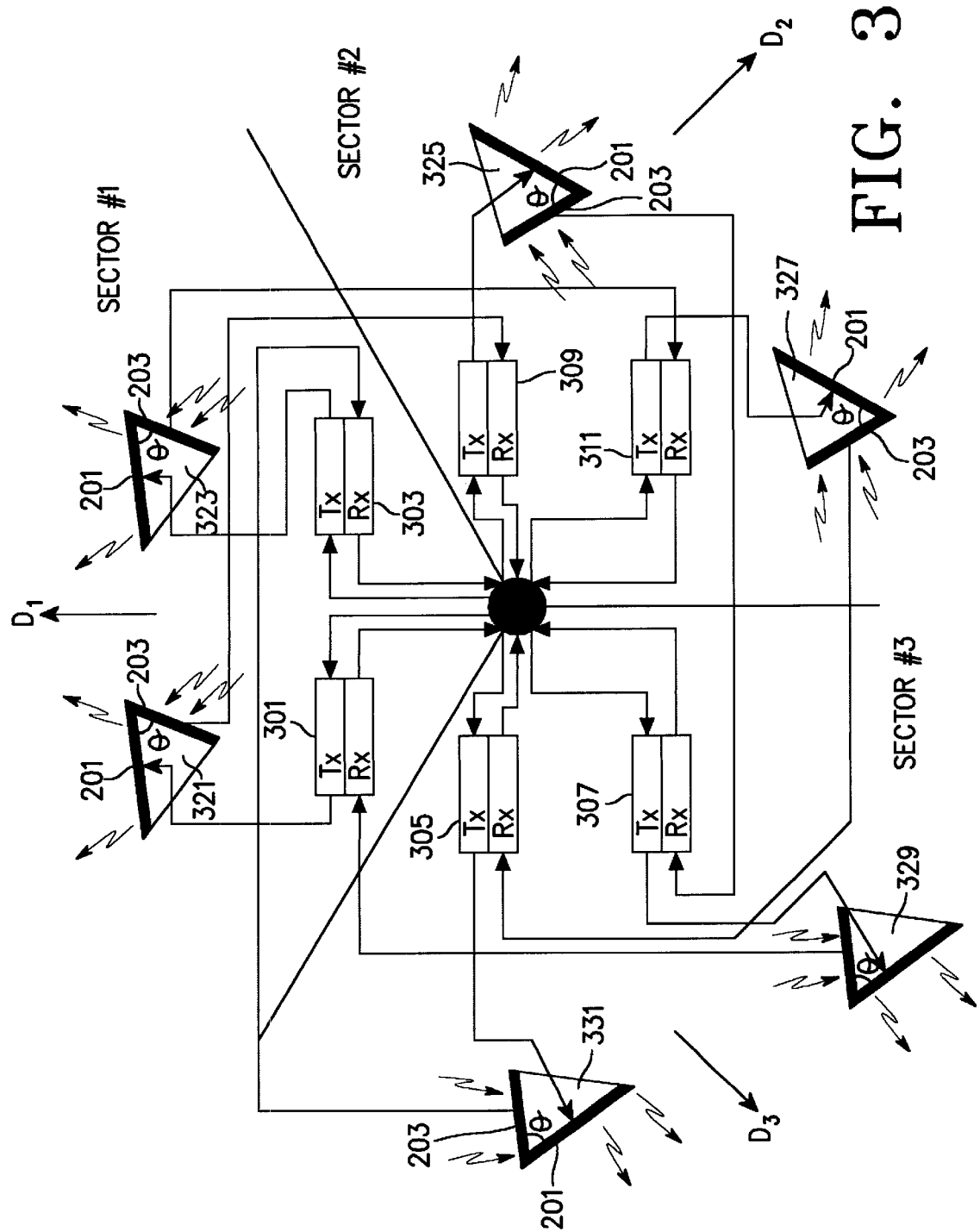
FIG. 3 illustrates an antenna layout according to the embodiment of the present invention.

Shown in FIG. 3 are directional vectors D1, D2 and D3. The directional vectors define the direction of the sectors.

The horizontal angle θ varies depending on an antenna layout in a base station. If antennas are arranged in n sectors in the base station, the horizontal angle θ of each antenna is 180–(360/n). The beam pattern or radiation angle of the antenna with respect to a cell angle and can be controlled by antenna fabrication technology.

The transmission antenna unit 201 of the triangular antenna transmits a signal in the direction of the directional vector of the sector where the triangular antenna is located. The reception antenna unit 203 of the triangular antenna receives a signal directed to an adjacent sector. Thus, triangular antenna in the second sector has its transmission antenna units aligned to transmit in the direction of directional vector D2 and has its receptor antenna units aligned to receive a signal sent along directional vector D3.

FIG. 3 illustrates an antenna layout and a connection between each triangular antenna and a pre-processor in a base station according to the embodiment of the present invention.

Referring to FIG. 3, two triangular antennas are assigned to each sector. For three sectors, there are six triangular antennas. The transmission antenna unit 201 of a triangular antenna 321 in a first sector is connected to the transmission port of a pre-processor 301. The transmission antenna unit 201 of a triangular antenna 323 also in the first sector is connected to the transmission port of a pre-processor 303. Therefore, each transmission antenna unit 201 of triangular antennas 321 and 323 transmits a signal in the direction of the first sector. The reception ports of the pre-processors 301 and 303 are connected to the reception antenna units 203 of triangular antennas 331 and 329, respectively, located in a third sector, adjacent to the first sector. Therefore, the pre-processors 301 and 303 receive signals directed along directional vector D1 from reception antenna units located in the third sector.

The transmission antenna unit 201 of triangular antennas 325 and 327 in the second sector are connected to transmission parts of pre-processors 309 and 311, respectively, and transmit signals in the direction of the second sector. The reception antenna units 203 of the triangular antennas 321 and 323 in the first sector are connected to the reception ports of pre-processors 309 and 311, respectively. Therefore, the reception antenna units 203 of the triangular antennas 321 and 323 in the first sector receive signals directed along directional vector D2, i.e., in the direction of the second sector and send the received signals to the reception ports of the pre-processors 309 and 311 in the second sector.

The transmission antenna units 201 of triangular antennas 329 and 331 in the third sector are connected to transmission ports of pre-processors 305 and 307, respectively, and transmit signals along directional vector D3, i.e., in the direction of the third sector. The reception antenna units 203 of the triangular antennas 325 and 327 in the second sector are connected to the reception ports of pre-processors 305 and 307, respectively, in the third sector. Therefore, the reception antenna units 203 of the triangular antennas 325 and 327 in the second sector receive signals directed along vector D3, i.e., in the direction of the third sector and sent them to pre-processors located in the third sector.

As described above, the present invention, since it employs an antenna structure and layout for separate transmission and reception, can be applied to a system having a wideband transmission/reception frequency band like IMT2000, using a reduced number of antennas.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An antenna apparatus in a mobile communication system where antennas are arranged in n sectors, comprising:
   a pair of pre-processors assigned to each sector for transmission and reception diversity, each pre-processor having a transmission port and a reception port for separating a transmission signal from a reception signal; and
   a pair of triangular antennas assigned to each sector, each triangular antenna having a transmission antenna unit for transmitting a transmission signal received via a transmission port in the sector in which the triangular antenna is located and in the direction of the sector, and a reception antenna unit connected to the transmission antenna unit at a predetermined horizontal angle θ, for receiving a signal directed to an adjacent sector and sending the received signal to the reception port of a pre-processor in an adjacent sector.

2. The antenna apparatus of claim 1, wherein the horizontal angle θ is defined by 180–(360/n).

3. An antenna apparatus in a mobile communication system where antennas are arranged in n sectors, comprising:
   at least one pre-processor assigned to each sector for transmission and reception of signals in the direction of the sector, each pre-processor having a transmission port and a reception port for separating a transmission signal from a reception signal; and
   at least one antenna unit assigned to each sector, each antenna unit having a transmission antenna unit for transmitting a transmission signal and a reception antenna unit for receiving a signal directed along the direction of an adjacent sector, wherein the transmission antenna unit and the reception antenna unit are connected at a predetermined horizontal angle θ.

4. The antenna apparatus of claim 3, wherein the horizontal angle θ is defined by 180–(360/n).

5. The antenna apparatus of claim 3, wherein the transmission port of each pre-processor is connected to a transmission antenna unit located in the sector to which the pre-processor unit is assigned, and the reception port of each pre-processor is connected to a reception antenna unit located in a sector adjacent to the sector to which the pre-processor is assigned.

* * * * *